US009204183B1

(12) United States Patent
Sukegawa et al.

(10) Patent No.: US 9,204,183 B1
(45) Date of Patent: Dec. 1, 2015

(54) VEHICLE-MOUNTED DEVICE AND DEVICE AUTHENTICATION METHOD

(71) Applicant: ALPINE ELECTRONICS, INC., Shinagawa-ku, Tokyo (JP)

(72) Inventors: Ryo Sukegawa, Iwaki (JP); Kentaro Yamamoto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 14/622,353

(22) Filed: Feb. 13, 2015

(30) Foreign Application Priority Data

May 13, 2014 (JP) .................................. 2014-099977

(51) Int. Cl.
| | |
|---|---|
| H04N 7/16 | (2011.01) |
| H04N 21/414 | (2011.01) |
| H04N 21/436 | (2011.01) |
| H04N 21/4627 | (2011.01) |
| H04N 21/258 | (2011.01) |

(52) U.S. Cl.
CPC ... *H04N 21/41422* (2013.01); *H04N 21/25816* (2013.01); *H04N 21/436* (2013.01); *H04N 21/4627* (2013.01)

(58) Field of Classification Search
CPC .................... H04N 21/41422; H04N 21/4627; H04N 21/25816; H04N 21/436
USPC ..................................................... 725/25, 75
See application file for complete search history.

(56) References Cited

U.S. PATENT DOCUMENTS

| | | | | |
|---|---|---|---|---|
| 6,240,414 B1 * | 5/2001 | Beizer | ............... | G06F 17/30176 |
| 7,814,515 B2 * | 10/2010 | Ohyama | ........... | H04L 29/06027 |
| | | | | 725/71 |
| 7,836,472 B2 * | 11/2010 | Brady, Jr. | ............... | H04H 20/62 |
| | | | | 725/115 |
| 7,984,190 B2 * | 7/2011 | Rhoads | ................... | H04L 67/06 |
| | | | | 709/248 |
| 8,176,363 B2 * | 5/2012 | Zlotnick | ............. | G06F 11/2082 |
| | | | | 711/161 |
| 8,649,161 B2 * | 2/2014 | Kato | ................... | B60R 11/0235 |
| | | | | 224/483 |

(Continued)

FOREIGN PATENT DOCUMENTS

| | | |
|---|---|---|
| DE | 102008010120 | 8/2008 |
| JP | 2008-211338 | 9/2008 |
| JP | 2011023932 | 2/2011 |

OTHER PUBLICATIONS

Extended European Search Report for EPO15158021.4 dated Jun. 26, 2015, 4 pgs.

*Primary Examiner* — Nasser Goodarzi
*Assistant Examiner* — Michael B Pierorazio
(74) *Attorney, Agent, or Firm* — Brinks Gilson & Lione

(57) ABSTRACT

A vehicle-mounted device includes a first authentication unit for performing first authentication processing in which, when a first device is connected to an output unit, the vehicle-mounted device is authenticated as a source device and the first device is authenticated as a sink device; a second authentication unit for performing second authentication processing in which, when a second device is connected to the input unit while a digital content is being output to the first device from the output unit, the vehicle-mounted device is authenticated as the sink device and the second device is authenticated as the source device; a determination unit; and a third authentication unit for performing third authentication processing in which the vehicle-mounted device is authenticated as a repeater device when a condition for providing the digital content from the second device to the first device is determined to be satisfied by the determination unit.

8 Claims, 4 Drawing Sheets

(56) References Cited

U.S. PATENT DOCUMENTS

| | | | |
|---|---|---|---|
| 9,041,670 B2* | 5/2015 | Kobayashi | G06F 3/0488 345/156 |
| 9,083,581 B1* | 7/2015 | Addepalli | H04W 4/046 |
| 2006/0174285 A1* | 8/2006 | Brady, Jr. | A63F 13/12 725/76 |
| 2007/0106771 A1* | 5/2007 | Lucash | H04L 67/1095 709/223 |
| 2007/0250873 A1* | 10/2007 | Ohyama | H04L 29/06027 725/82 |
| 2008/0016081 A1* | 1/2008 | MacMillan | G06F 17/30864 |
| 2008/0016196 A1* | 1/2008 | MacMillan | G06F 17/30017 709/223 |
| 2012/0112694 A1* | 5/2012 | Frisch | B60L 11/1824 320/109 |
| 2013/0093958 A1* | 4/2013 | Yoshikawa | G01C 21/3661 348/705 |
| 2013/0144487 A1* | 6/2013 | Suzuki | G06F 17/00 701/36 |
| 2013/0303078 A1 | 11/2013 | Konishi | |
| 2014/0059184 A1* | 2/2014 | Bird | H04H 20/62 709/219 |
| 2014/0074918 A1* | 3/2014 | Wang | G06F 9/44 709/203 |
| 2014/0366125 A1* | 12/2014 | Murata | H04W 12/06 726/17 |

* cited by examiner

VEHICLE-MOUNTED DEVICE AND DEVICE AUTHENTICATION METHOD

RELATED APPLICATION

The present application claims priority to Japanese Patent Application Number 2014-099977, filed May 13, 2014, the entirety of which is hereby incorporated by reference.

BACKGROUND

1. Field of the Invention

The present disclosure relates to a vehicle-mounted device including an input device connected to a device compatible with a predetermined interface standard such as HDMI (registered trademark) (High Definition Multimedia Interface) and inputting a digital content from the device and an output unit connected to a device compatible with the predetermined interface standard and outputting a digital content to the device, and a device authentication method for a vehicle-mounted system including the vehicle-mounted device.

2. Description of the Related Art

A vehicle-mounted system including a digital television tuner, display monitors provided for a front seat and a back seat, and a navigation apparatus has been suggested (JP 2008-211338 A). In this vehicle-mounted system, in accordance with a command from the navigation apparatus serving as a system master in the vehicle-mounted system, a digital television tuner serving as a source device authenticates the navigation apparatus as an authentic repeater device and authenticates the display monitor, which is to display a digital video content, as an authentic sink device. After the authentication, a digital video content which is output from the digital television tuner serving as the source device is relayed by the navigation apparatus serving as the repeater device and is distributed to the display monitor serving as the sink device, so that the display monitor displays the digital video content which is output from the digital television tuner.

In the vehicle-mounted system described in JP 2008-211338 A, when the display monitor to which the digital video content is to be output (on which the digital video content is to be displayed) is changed (change of the distribution path), e.g., when the state is changed from a state in which the digital video content is distributed to both of the display monitors for the front and back seats to a state in which the digital video content is distributed to only the display monitor for the front seat, the distribution of the digital video content from the digital television tuner is stopped temporarily on the basis of the command from the navigation apparatus, and the changed display monitor is authenticated as the authentic sink device. Therefore, in JP 2008-211338 A, the video of the display monitor which is commonly used before and after the change (the display monitor for the front seat in the example) temporarily blacks out, and the problem that this causes the users to feel annoyed has been identified.

Also, a vehicle-mounted system is known which includes a vehicle-mounted device including an input unit connected to a device compatible with the HDMI (High Definition Multimedia Interface) and inputting a digital content from the device and an output unit connected to a device compatible with the HDMI and outputting a digital content to the device. In such vehicle-mounted system, when a first device compatible with the HDMI (for example, a display device provided for the back seat) is connected to the output unit of the vehicle-mounted device, and the second device compatible with the HDMI (for example, a smartphone) is connected to the input unit of the vehicle-mounted device, then, the first device is authenticated as a sink device, the second device is authenticated as a source device, and the vehicle-mounted device is authenticated as a repeater device. For example, when the output unit of the vehicle-mounted device outputs a digital video content to the first device (the display device provided for the back seat) and the second device (smartphone) is connected to the input unit of the vehicle-mounted device while the digital video content is being output (displayed) from the first device, the output of the digital video content from the output unit of the vehicle-mounted device to the first device is temporarily interrupted when the vehicle-mounted device, the first device, and second device authenticate the vehicle-mounted device as a repeater device, and this causes the output (for example, display) of the digital content of the first device to be temporarily stopped (for example, the video temporarily blacks out), and the same problem as the problem associated with the system described in JP 2008-211338 A may occur. More specifically, the problem that the users feel annoyed may occur.

The present invention is made in view of such circumstances, and embodiments of the present invention provide a vehicle-mounted device capable of making it less likely for the user to feel annoyed about a change in the output of a connected device due to authentication processing. In addition, embodiments of the present invention provide a device authentication method in a vehicle-mounted system including the vehicle-mounted device.

SUMMARY

A vehicle-mounted device according to the present disclosure may be a vehicle-mounted device including an input unit connected to a device compatible with a predetermined interface standard and inputting a digital content from the device and an output unit connected to a device compatible with the predetermined interface standard and outputting a digital content to the device, and the vehicle-mounted device includes a first authentication unit for performing first authentication processing in which, when a first device compatible with the predetermined interface standard is connected to the output unit, the vehicle-mounted device and the first device authenticate the vehicle-mounted device as a source device at a transmission side of the digital content and authenticate the first device as a sink device at a reception side of the digital content, a second authentication unit for performing second authentication processing in which, when a second device compatible with the predetermined interface standard is connected to the input unit while the digital content is output to the first device authenticated as the sink device from the output unit, the vehicle-mounted device and the second device authenticate the vehicle-mounted device as the sink device and authenticate the second device as the source device, a determination unit for determining whether a condition for providing the digital content from the second device authenticated as the source device to the first device authenticated as the sink device is satisfied or not, and a third authentication unit for performing third authentication processing in which, when the determination unit determines that the condition for providing the digital content from the second device to the first device is satisfied, then, the vehicle-mounted device, the second device, and the first device authenticate the vehicle-mounted device as a repeater device for relaying a digital content between the second device authenticated as the source device and the first device authenticated as the sink device, wherein the digital content from the second device which is input from the input unit is relayed and output to the first device via the output unit after the third authentication unit finishes the third authentication processing.

According to such a configuration, when the first device compatible with the predetermined interface standard is connected to the output unit of the vehicle-mounted device, the vehicle-mounted device is authenticated as the source device, and the first device is authenticated as the sink device, and the digital content is output from the output unit of the vehicle-mounted device to the first device. When the second device compatible with the predetermined interface standard is connected to the input unit while the digital content is output to the first device authenticated as the sink device from the output unit, the vehicle-mounted device is authenticated as the sink device, and the second device is authenticated as the source device. At this occasion, the vehicle-mounted device is not immediately authenticated as the repeater device for relaying the digital content from the second device authenticated as the source device to the first device authenticated as the sink device, and instead, when the condition for providing the digital content from the second device authenticated as the source device to the first device authenticated as the sink device is satisfied, the vehicle-mounted device is authenticated as the repeater device for relaying the digital content from the second device authenticated as the source device to the first device authenticated as the sink device.

The vehicle-mounted device according to the present disclosure may include: a selection unit for selecting a device connected to the input unit as a source device of the digital content which is to be output from the output unit, and when the selection unit selects the second device as a source device of the digital content which is to be output from the output unit, the determination unit determines that the condition for providing the digital content from the second device to the first device is satisfied.

According to such a configuration, when the second device connected to the input unit is selected as the source device of the digital content which is to be output from the output unit, the vehicle-mounted device is authenticated as the repeater device for relaying the digital content from the second device authenticated as the source device to the first device authenticated as the sink device.

The vehicle-mounted device according to the present disclosure may include a content output stop control unit configured such that when the selection unit selects the second device as the source device of the digital content which is to be output from the output unit, the content output stop control unit stops output of the digital content from the output unit to the first device which has been performed until then.

According to such a configuration, when the second device is selected as the source device of the digital content which is to be output from the output unit, output of the digital content from the output unit to the first device which has been performed until then is stopped, and the vehicle-mounted device is authenticated as the repeater device.

A vehicle-mounted device according to the present disclosure may be a vehicle-mounted device including an input unit connected to a device compatible with a predetermined interface standard and inputting a digital content from the device and an output unit connected to a device compatible with the predetermined interface standard and outputting a digital content to the device, and the vehicle-mounted device includes a first authentication unit for performing first authentication processing in which, when a first device compatible with the predetermined interface standard is connected to the output unit, the vehicle-mounted device and the first device authenticate the vehicle-mounted device as a source device at a transmission side of the digital content compatible with the predetermined interface standard and authenticate the first device as a sink device at a reception side of the digital content compatible with the predetermined interface standard, a second authentication unit for performing second authentication processing in which, when a second device compatible with the predetermined interface standard is connected to the input unit while the digital content is output to the first device authenticated as the sink device from the output unit, the vehicle-mounted device and the second device authenticate the vehicle-mounted device as the sink device and authenticate the second device as the source device, and a third authentication unit for performing third authentication processing in which the vehicle-mounted device, the second device, and the first device authenticate the vehicle-mounted device as a repeater device for relaying a digital content between the second device authenticated as the source device and the first device authenticated as the sink device, wherein the digital content from the second device which is input from the input unit is relayed and output to the first device via the output unit after the third authentication unit finishes the third authentication processing, and the vehicle-mounted device further includes a determination unit for determining whether a condition for providing the digital content from the second device authenticated as the source device to the first device authenticated as the sink device is satisfied or not, and an authentication suspension control unit configured such that, when the determination unit determines that the condition for providing the digital content from the second device to the first device is not satisfied, the authentication suspension control unit suspends the third authentication processing performed by the third authentication unit.

According to such a configuration, when the first device compatible with the predetermined interface standard is connected to the output unit of the vehicle-mounted device, the vehicle-mounted device is authenticated as the source device, and the first device is authenticated as the sink device, and the digital content is output from the output unit of the vehicle-mounted device to the first device. When the second device compatible with the predetermined interface standard is connected to the input unit while the digital content is output to the first device authenticated as the sink device from the output unit, the vehicle-mounted device is authenticated as the sink device, and the second device is authenticated as the source device. When the condition for providing the digital content from the second device authenticated as the source device to the first device authenticated as the sink device is not satisfied, it is suspended to authenticate the vehicle-mounted device as the repeater device for relaying the digital content from the second device authenticated as the source device to the first device authenticated as the sink device.

A device authentication method according to the present disclosure may be a device authentication method for a vehicle-mounted system including a vehicle-mounted device including an input unit connected to a device compatible with a predetermined interface standard and inputting a digital content from the device and an output unit connected to a device compatible with the predetermined interface standard and outputting a digital content to the device, and the device authentication method includes a first authentication step in which, when a first device compatible with the predetermined interface standard is connected to the output unit of the vehicle-mounted device, the vehicle-mounted device and the first device authenticate the vehicle-mounted device as a source device at a transmission side of the digital content compatible with the predetermined interface standard and authenticate the first device as a sink device at a reception side of the digital content compatible with the predetermined interface standard, a second authentication step in which, when a second device compatible with the predetermined interface standard is connected to the input unit of the vehicle-mounted device while the digital content is output to the first device authenticated as the sink device from the output unit of the vehicle-mounted device, the vehicle-mounted device and the second device authenticate the vehicle-mounted device as the sink device and authenticate the second device as the source device, a determination step for determining whether a condition for providing the digital content from the second device authenticated as the source device to the first device authenticated as the sink device is satisfied or not in the vehicle-mounted device, and a third authentication step in which, when the condition for providing the digital content from the second device to the first device is determined to be satisfied, then, the vehicle-mounted device, the second device, and the first device authenticate the vehicle-mounted device as a repeater device for relaying a digital content between the second device authenticated as the source device and the first device authenticated as the sink device.

A device authentication method according to the present disclosure may be a device authentication method for a vehicle-mounted system including a vehicle-mounted device including an input unit connected to a device compatible with a predetermined interface standard and inputting a digital content from the device and an output unit connected to a device compatible with the predetermined interface standard and outputting a digital content to the device, and the device authentication method includes a first authentication step in which, when a first device compatible with the predetermined interface standard is connected to the output unit of the vehicle-mounted device, the vehicle-mounted device and the first device authenticate the vehicle-mounted device as a source device at a transmission side of the digital content compatible with the predetermined interface standard and authenticate the first device as a sink device at a reception side of the digital content compatible with the predetermined interface standard, a second authentication step in which, when a second device compatible with the predetermined interface standard is connected to the input unit of the vehicle-mounted device while the digital content is output to the first device authenticated as the sink device from the output unit of the vehicle-mounted device, the vehicle-mounted device and the second device authenticate the vehicle-mounted device as the sink device and authenticate the second device as the source device, a third authentication step in which the vehicle-mounted device, the second device, and the first device authenticate the vehicle-mounted device as a repeater device for relaying a digital content between the second device authenticated as the source device and the first device authenticated as the sink device, a determination step for determining whether a condition for providing the digital content from the second device authenticated as the source device to the first device authenticated as the sink device is satisfied or not in the vehicle-mounted device, and an authentication suspension control step in which, when the condition for providing the digital content from the second device to the first device is determined not to be satisfied in the determination step, the authentication in the third authentication step is suspended.

According to embodiments of the vehicle-mounted device of the present disclosure, when the second device serving as the source device is connected to the input unit while the digital content is output to the first device authenticated as the sink device from the output unit, the vehicle-mounted device is not immediately authenticated as the repeater device for relaying the digital content from the second device authenticated as the source device to the first device authenticated as the sink device, and instead, when a condition for providing the digital content from the second device to the first device is satisfied, the vehicle-mounted device is authenticated as the repeater device for relaying the digital content from the second device to the first device. Therefore, even if the output of the digital content to the first device authenticated as the sink device is stopped when the vehicle-mounted device is authenticated as the repeater device, the user understands that the fact that the condition for providing the digital content from the second device to the first device is satisfied means that it is a time to switch the digital content which is output to the first device, and therefore, the user is less likely to feel annoyed about the change in the output of the connection device (first device) due to the authentication processing.

DETAILED DESCRIPTION OF THE PREFERRED EMBODIMENTS

Hereinafter, an embodiment of the present invention will be explained with reference to the drawings.

Figure 1:
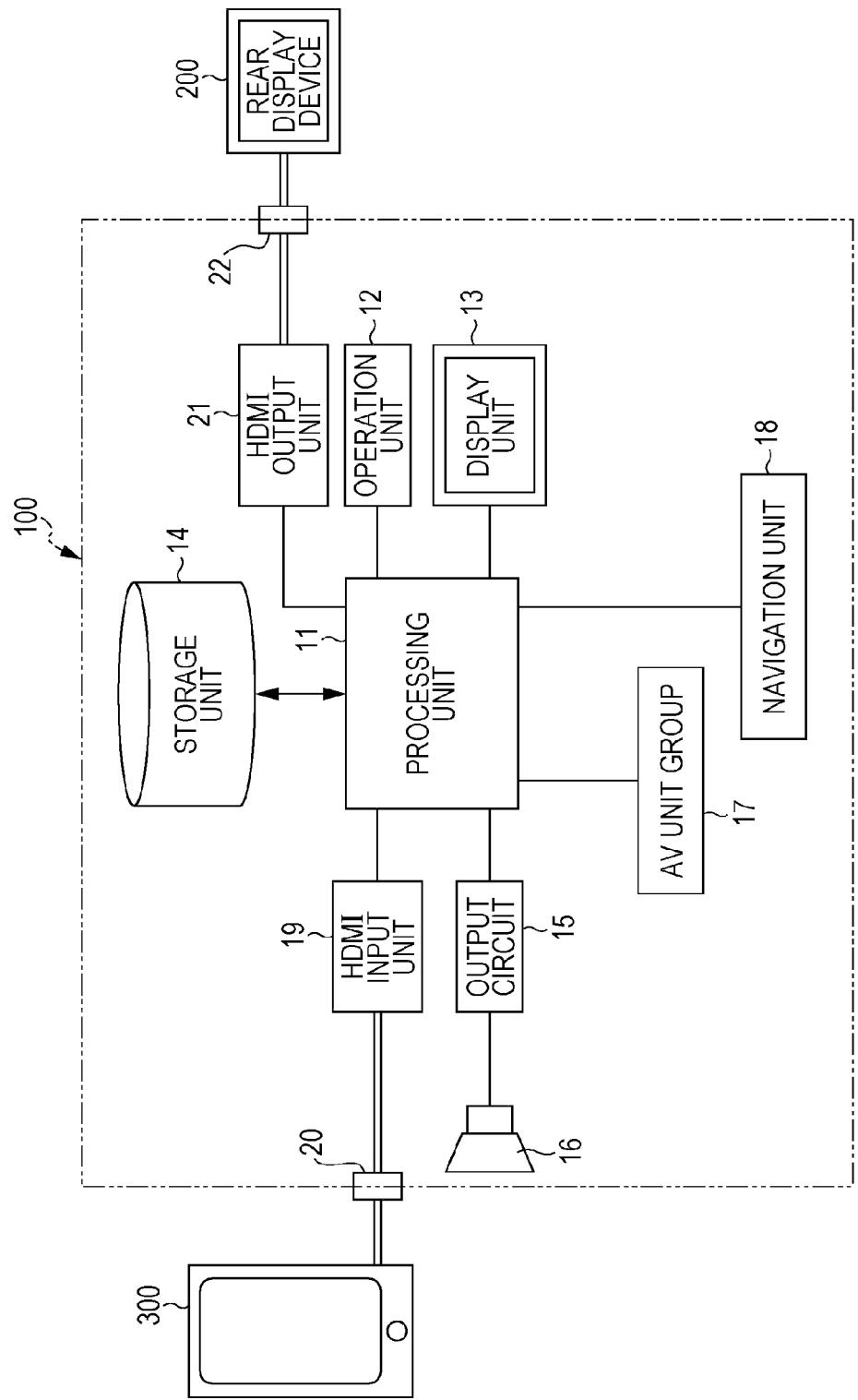
FIG. 1 is a block diagram illustrating a configuration of a vehicle-mounted device according to an embodiment of the present invention.

A vehicle-mounted device according to an embodiment of the present invention is configured as shown in FIG. 1.

In FIG. 1, a vehicle-mounted device 100 has a computer unit (including a CPU), and has a processing unit 11 executing various kinds of processing in accordance with a program. The processing unit 11 is connected to a navigation unit 18 performing navigation processing such as route guidance of a vehicle and an AV unit group 17 (including a CD/DVD drive, a digital television, a digital radio, and the like) outputting a digital video content. The processing unit 11 is connected to an output circuit 15 connected to a speaker 16. Under the control of the processing unit 11, an audio signal from the AV unit group 17 and the navigation unit 18 is provided via the output circuit 15 to the speaker 16, and sound based on the audio signal is output from the speaker 16. The processing unit 11 is further connected to a storage unit 14 (for example, hard disk drive) storing various kinds of information such as audio information and video information (digital video content) subjected to playback processing by the AV unit group 17 and map information used for processing with the navigation unit 18.

The vehicle-mounted device 100 includes a display unit 13 constituted by an LCD panel and provided on an instrument panel or the like facing the front seat of the vehicle, and an operation unit 12 constituted by a touch panel or the like integrally provided with the display unit 13 (LCD panel). The processing unit 11 executes various kinds of processing on the basis of input information according to the operation of the operation unit 12, and can display, on the display unit 13, information about an image and the like obtained from various kinds of processing.

Further, the vehicle-mounted device 100 includes an HDMI input unit 19 and an input terminal 20. Under the control of the processing unit 11, the HDMI input unit 19 inputs a signal of a digital video content that is output according to a rule specified in the HDMI from a device (for example, smartphone 300) compatible with the interface standard of the HDMI connected via an HDMI cable to the input terminal 20. The processing unit 11 can display, on the display unit 13, a digital video content which is input with the HDMI input unit 19. The vehicle-mounted device 100 includes an HDMI output unit 21 and an output terminal 22. Under the control of the processing unit 11, the HDMI output unit 21 outputs a digital video content provided by the AV unit group 17 to a device (for example, a rear display device 200 provided at the back seat) compatible with the HDMI interface standard connected via an HDMI cable to the output terminal 22 in accordance with a rule specified in the HDMI interface standard.

The processing unit 11 can also output a digital video content, which is input by the HDMI input unit 19 from a device connected to the input terminal 20, to a device connected to the output terminal 22 via the HDMI output unit 21.

Figure 2:
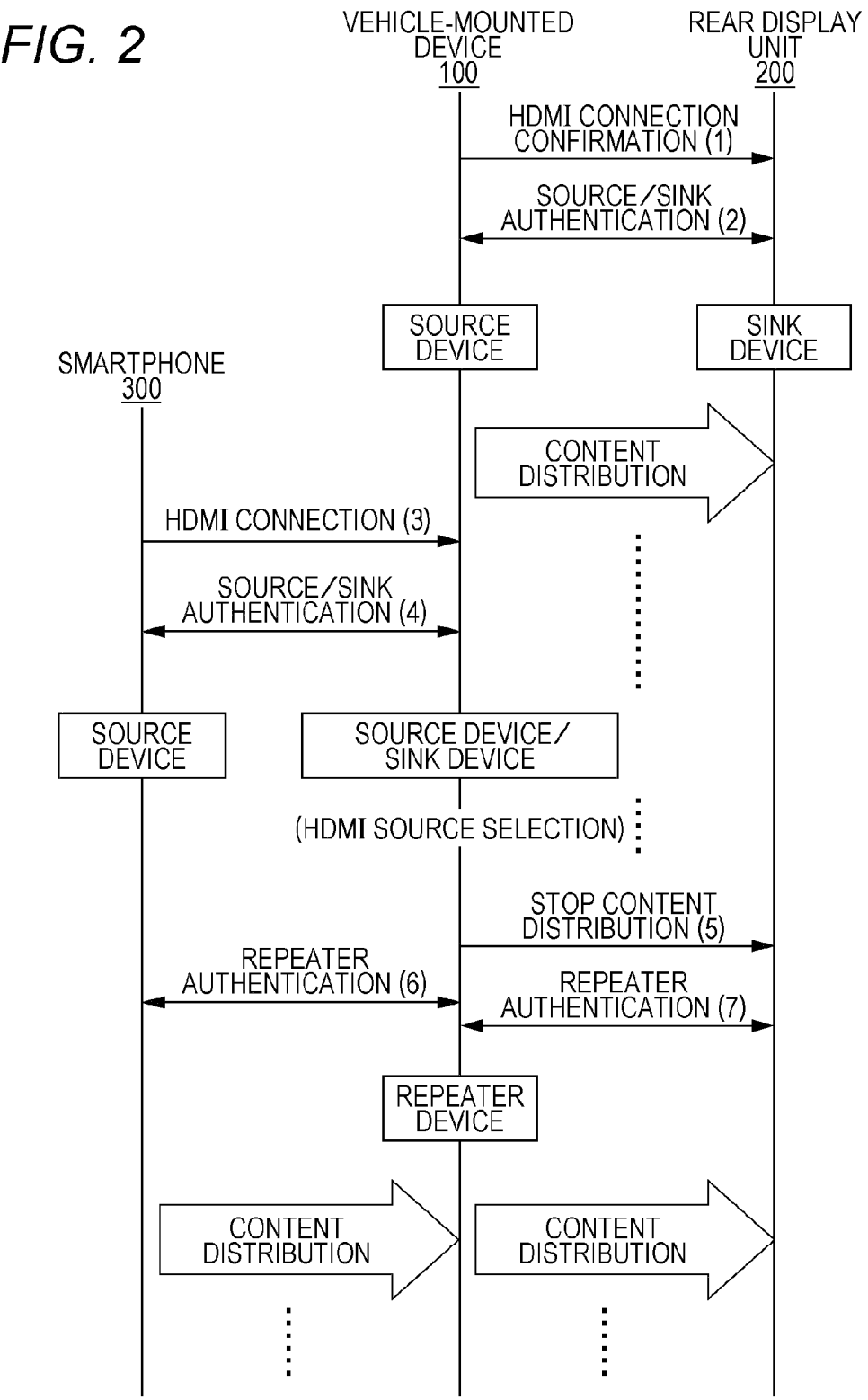
FIG. 2 is a sequence diagram illustrating a flow of processing when a video content is distributed in a vehicle-mounted system including a vehicle-mounted device, a portable terminal, and a rear display device.
Figure 3:
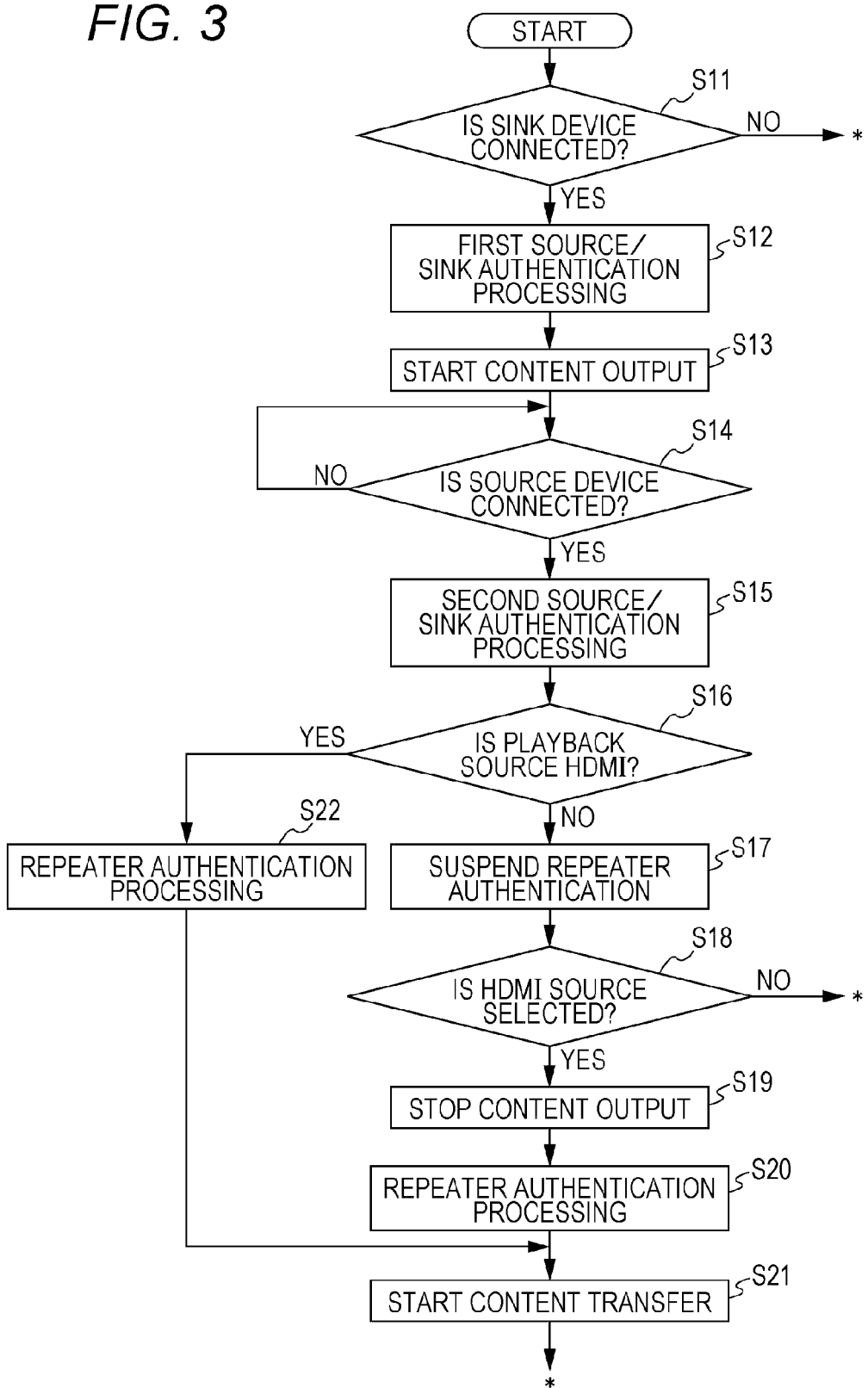
FIG. 3 is a flowchart illustrating a flow of processing which is to be executed by a processing unit of the vehicle-mounted device in the processing on the vehicle-mounted system as shown in FIG. 2.

In a case where the rear display unit 200 (compatible with the HDMI) provided at the back seat side of the vehicle is connected to the output terminal 22 of the vehicle-mounted device 100 as shown in FIG. 1, and subsequently, the smartphone 300 (compatible with the HDMI) is connected to the input terminal 20, then, processing according to the sequence as shown in FIG. 2 is performed by the vehicle-mounted device 100, the rear display device 200, and the smartphone 300. In this event, the processing unit 11 of the vehicle-mounted device 100 executes processing in accordance with a procedure as shown in FIG. 3.

When the vehicle-mounted device 100 confirms that the rear display device 200 (HDMI compatible device: first device) is connected to the HDMI output unit 21 via the output terminal 22 (see (1) in FIG. 2), the vehicle-mounted device 100 and the rear display unit 200 authenticate the vehicle-mounted device 100 as a source device at a transmission side of a digital content, and authenticate the rear display device 200 as a sink device at a reception side of a digital content (see (2) in FIG. 2). In this process, when the processing unit 11 of the vehicle-mounted device 100 determines that the rear display unit 200 which is an HDMI compatible device is connected to the HDMI output unit 21 (YES in S11 in FIG. 3), the vehicle-mounted device 100 and the rear display unit 200 perform first source/sink authentication processing (first authentication processing) to authenticate the vehicle-mounted device 100 as a source device and authenticate the rear display device 200 as a sink device (S12 in FIG. 3: first authentication unit). When the vehicle-mounted device 100 and the rear display device 200 authenticate the vehicle-mounted device 100 as the source device and authenticate the rear display unit 200 as the sink device, the processing unit 11 causes the HDMI output unit 21 to start output of the digital video content from, e.g., a digital television, in the AV unit group 17 to the rear display device 200 in accordance with a rule defined in the HDMI (S13 of FIG. 3). Accordingly, for example, the digital video content of the digital television is distributed from the vehicle-mounted device 100 serving as the source device to the rear display unit 200 serving as the sink device, and the rear display unit 200 outputs the distributed digital video content (display and audio output) (see FIG. 2).

As described above, when the vehicle-mounted device 100 confirms that the smartphone 300 (HDMI compatible device: second device) is connected to the HDMI input unit 19 via the input terminal 20 (see (3) in FIG. 2) while the digital video content is output from the vehicle-mounted device 100 (source device) to the rear display unit 200 (sink device), the vehicle-mounted device 100 and the smartphone 300 authenticate the vehicle-mounted device 100 as the sink device at the reception side of the digital content, and authenticates the smartphone 300 as the source device at the transmission side of the digital content (see (4) in FIG. 2). In this process, when the processing unit 11 of the vehicle-mounted device 100 monitoring connection of an HDMI compatible device to the HDMI input unit 19 (see S14 in FIG. 3) determines that the smartphone 300 which is the HDMI compatible device is connected to the HDMI input unit 19 (YES in S14 in FIG. 3) after the HDMI output unit 21 is caused to output the digital video content to the rear display unit 200 (see S13 in FIG. 3), the vehicle-mounted device 100 and the smartphone 300 perform second source/sink authentication processing (second authentication processing) to authenticate the vehicle-mounted device 100 as the sink device and authenticate the smartphone 300 as the source device (S15 in FIG. 3: second authentication unit).

In this event, as between the vehicle-mounted device 100 and the rear display unit 200, the vehicle-mounted device 100 is recognized as the source device, and the rear display unit 200 is recognized as the sink device, and as between the vehicle-mounted device 100 and the smartphone 300, the vehicle-mounted device 100 is recognized as the sink device, and the smartphone 300 is recognized as the source device. Then, for example, the digital video content from the digital television which is output from the vehicle-mounted device 100 is distributed to the rear display unit 200, and the digital video content is output from the rear display unit 200.

Figure 4:
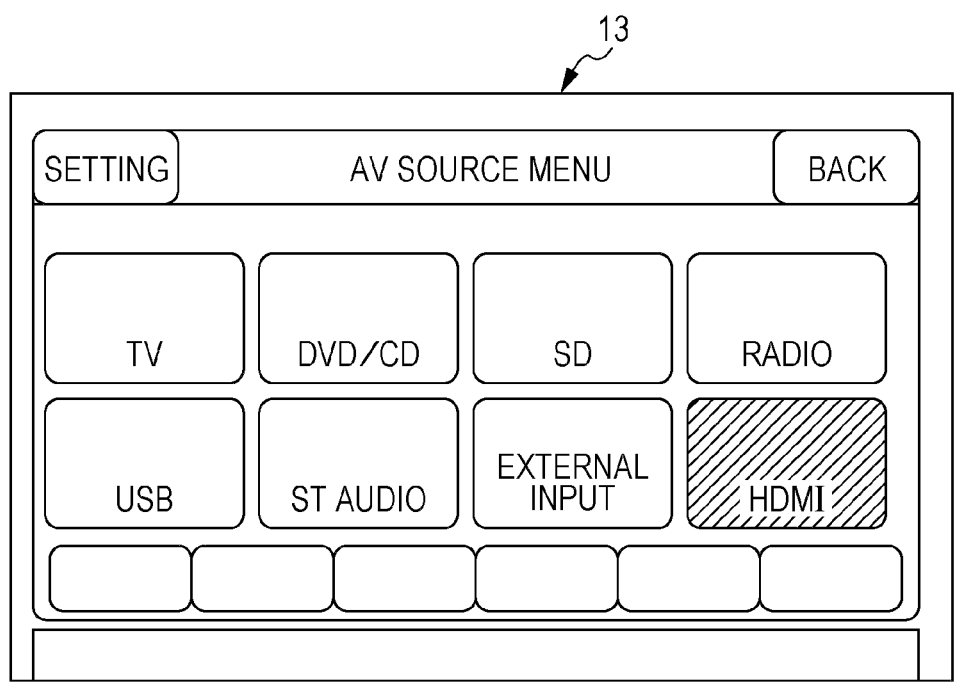
FIG. 4 is a figure illustrating an example of a selection screen of source devices displayed on a display unit of the vehicle-mounted device.

In this situation, the processing unit 11 of the vehicle-mounted device 100 determines whether the source to be played back is the HDMI or not (S16 in FIG. 3). At this time, playback of the video content from the smartphone 300 (HDMI compatible device) serving as the source device has not yet been started (NO in S16 in FIG. 3), and therefore, the processing unit 11 displays, on the display unit 13, a selection screen (selection unit) of an AV source device as shown in FIG. 4 on the basis of, e.g., an operation performed with the operation unit 12 by the user. Then, the processing unit 11 suspends execution of relay authentication processing for authenticating the vehicle-mounted device 100 as a repeater device for relaying a digital video content between the smartphone 300 authenticated as the source device connected to the HDMI input unit 19 and the rear display unit 200 authenticated as the sink device connected to the HDMI output unit 21 (S17 in FIG. 3: authentication suspending control unit). Then, the processing unit 11 determines whether an operation for selecting an HDMI compatible device as an AV source device (operation of an "HDMI" button in FIG. 4) is performed or not in a selection screen (see FIG. 4) displayed on the display unit 13, and more specifically, the processing unit 11 determines whether a condition for providing a digital video content from the smartphone 300 (second device) authenticated as the source device to the rear display unit 200 (first device) authenticated as the sink device is satisfied or not (S18 in FIG. 3).

When an operation for selecting an HDMI compatible device (operation of the "HDMI" button) is performed on the selection screen of the AV source device (see FIG. 4) (YES in S18), the processing unit 11 determines that the condition for providing a digital video content from the smartphone 300

(second device) authenticated as the source device to the rear display unit 200 (first device) authenticated as the sink device is satisfied, and stops the output of the digital video content of the digital television to the rear display unit 200 serving as the sink device connected to the HDMI output unit 21 (S19).

As described above, in the vehicle-mounted system, when the HDMI compatible device connected to the HDMI output unit 21 is selected as the AV source device, the distribution of the digital video content of the digital television from the vehicle-mounted device 100 to the rear display unit 200 is stopped (see (5) in FIG. 2). As a result, the output (display and audio output) of the digital video content on the rear display unit 200 is no longer provided, and, for example, the screen of the rear display unit 100 blacks out. In this state, in the vehicle-mounted device 100, the smartphone 300 connected to the HDMI input unit 19, and the rear display unit 200 connected to the HDMI output unit 21, the smartphone 300 authenticated as the source device and the rear display unit 200 recognized as the sink device authenticate the vehicle-mounted device 100 as the repeater device for relaying a digital video content between the smartphone 300 and the rear display unit 200 (see (6), (7) in FIG. 2)

In this process, the processing unit 11 of the vehicle-mounted device 100 stops the output of the digital video content from the digital television via the HDMI output unit 21 to the rear display unit 200 (see S19 in FIG. 3), and thereafter, the vehicle-mounted device 100, the smartphone 300, and the rear display unit 200 performs relay authentication processing (third authentication processing) for authenticating the vehicle-mounted device 100 as the repeater device for relaying the digital video content between the smartphone 300 and the rear display unit 200 (S20 in FIG. 3: third authentication unit).

Thereafter, the processing unit 11 relays the digital video content from the smartphone 300 which is input from the HDMI input unit 19, and causes the HDMI output unit 21 to output the digital video content to the rear display unit 200 (S21 in FIG. 3). Therefore, the digital video content from the smartphone 300 is distributed to the rear display unit 200 via the vehicle-mounted device 100 authenticated as the repeater device (see FIG. 2). The digital video content provided from the smartphone 300 is displayed on the rear display unit 200.

It should be noted that the processing unit 11 of the vehicle-mounted device 100 executes predetermined processing according to a predetermined procedure after relay transfer of the digital video content from the smartphone 300 to the rear display unit 200 is started (see * mark in FIG. 3). When the video content from the HDMI compatible device serving as the source device starts to be played back (YES in S16), the processing unit 11 executes the relay authentication processing without suspending the processing to perform the processing of relaying the digital video content from the HDMI compatible device and outputting the digital video content to the rear display unit 200 (S21 in FIG. 3)

Further, when the HDMI compatible device is not connected to the HDMI output unit 21 (NO in S11 in FIG. 3), or when any HDMI compatible device is not selected on the selection screen (see FIG. 4) (NO in S18 in FIG. 3), then, the processing unit 11 executes a predetermined processing according to a predetermined procedure (see * mark in FIG. 3).

According to the vehicle-mounted device 100 as described above, when the smartphone 300 serving as the source device is connected to the HDMI input unit 19 while digital video content already is output to the rear display unit 200 authenticated as the sink device from the HDMI output unit 21, the vehicle-mounted device 100 is not immediately authenticated as the repeater device for relaying the digital video content from the smartphone 300 authenticated as the source device to the rear display unit 200 authenticated as the sink device, and instead, the HDMI compatible device is selected on the selection screen of the AV source devices as shown in FIG. 4, and when a condition for providing the digital content from the smartphone 300 to the rear display unit 200 is satisfied, the vehicle-mounted device 100 is authenticated as the repeater device for relaying the digital video content from the smartphone 300 to the rear display unit 200.

Therefore, even if the output of the digital video content of the digital television to the rear display unit 200 authenticated as the sink device is stopped when the vehicle-mounted device 100 is authenticated as the repeater device, the user who operates the selection screen in order to switch the source device of the digital video content by his or her own will is already understanding that it is a time to switch the digital video content which is output to the rear display unit 200, and therefore, even if the output of the digital video content from the rear display unit 200 is lost when the relay authentication is performed, the user is less likely to feel annoyed by the change in the output.

The vehicle-mounted device according to the present disclosure has the effect of making it less likely for the user to feel annoyed by a change in the output of a connected device due to authentication processing, and the vehicle-mounted device according to the present disclosure is useful as a vehicle-mounted device including an input device connected to a device compatible with a predetermined interface standard such as HDMI (High Definition Multimedia Interface) and inputting a digital content from the device and an output unit connected to a device compatible with the predetermined interface standard and outputting a digital content to the device.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted device including an input unit connectable to a device compatible with a predetermined interface standard and inputting a digital content from the device and an output unit connectable to a device compatible with the predetermined interface standard and outputting a digital content to the device, the vehicle-mounted device comprising:

a first authentication unit for performing first authentication processing in which, when a first device compatible with the predetermined interface standard is connected to the output unit, the vehicle-mounted device and the first device authenticate the vehicle-mounted device as a source device at a transmission side of the digital content and authenticate the first device as a sink device at a reception side of the digital content;

a second authentication unit for performing second authentication processing in which, when a second device compatible with the predetermined interface standard is connected to the input unit while the digital content is being output to the first device authenticated as the sink device from the output unit, the vehicle-mounted device and the second device authenticate the vehicle-mounted device as the sink device and authenticate the second device as the source device;

a third authentication unit for performing third authentication processing in which the vehicle-mounted device, the second device, and the first device authenticate the vehicle-mounted device as a repeater device for relaying a digital content between the second device authenticated as the source device and the first device authenticated as the sink device;

a determination unit for determining whether a condition for providing the digital content from the second device authenticated as the source device to the first device authenticated as the sink device is satisfied or not; and a content output control unit configured such that, when the determination unit determines that the condition for providing the digital content from the second device to the first device is satisfied, the digital content from the second device which is input from the input unit is relayed and output to the first device via the output unit after the third authentication unit finishes the third authentication processing.

2. The vehicle-mounted device according to claim 1 comprising:

a selection unit for selecting a device connected to the input unit as a source device of the digital content which is to be output from the output unit, characterized in that when the selection unit selects the second device as a source device of the digital content which is to be output from the output unit, the determination unit determines that the condition for providing the digital content from the second device to the first device is satisfied.

3. The vehicle-mounted device according to claim 2 comprising a content output stop control unit configured such that when the selection unit selects the second device as the source device of the digital content which is to be output from the output unit, the content output stop control unit stops output of the digital content from the output unit to the first device which has been performed until then.

4. The vehicle-mounted device according to claim 1 comprising an authentication suspending control unit for suspending the third authentication processing performed by the third authentication unit when the determination unit determines that the condition for providing the digital content from the second device to the first device is not satisfied.

5. A device authentication method for operating a vehicle-mounted system including a vehicle-mounted device including an input unit connectable to a device compatible with a predetermined interface standard and inputting a digital content from the device and an output unit connectable to a device compatible with the predetermined interface standard and outputting a digital content to the device, the device authentication method comprising:

a first authentication act in which, when a first device compatible with the predetermined interface standard is connected to the output unit, the vehicle-mounted device and the first device authenticate the vehicle-mounted device as a source device at a transmission side of the digital content and authenticate the first device as a sink device at a reception side of the digital content;

a second authentication act in which, when a second device compatible with the predetermined interface standard is connected to the input unit while the digital content is being output to the first device authenticated as the sink device from the output unit, the vehicle-mounted device and the second device authenticate the vehicle-mounted device as the sink device and authenticate the second device as the source device;

a third authentication act in which the vehicle-mounted device, the second device, and the first device authenticate the vehicle-mounted device as a repeater device for relaying a digital content between the second device authenticated as the source device and the first device authenticated as the sink device;

a determination act for determining whether a condition for providing the digital content from the second device authenticated as the source device to the first device authenticated as the sink device is satisfied or not; and a content output control act in which, when the condition for providing the digital content from the second device to the first device is determined to be satisfied in the determination act, the digital content from the second device which is input from the input unit is relayed and output to the first device via the output unit after the authentication in the third authentication act is finished.

6. The device authentication method according to claim 5 comprising:

a selection act for selecting a device connected to the input unit as a source device of the digital content which is to be output from the output unit, characterized in that when the second device is selected in the selection act as a source device of the digital content which is to be output from the output unit, the condition for providing the digital content from the second device to the first device is determined to be satisfied in the determination act.

7. The device authentication method according to claim 6 comprising a content output stop control act for stopping output of the digital content from the output unit to the first device which has been performed until then, when the second device is selected in the selection act as the source device of the digital content which is to be output from the output unit.

8. The device authentication method according to claim 5 comprising an authentication suspending control act for suspending the authentication in the third authentication act when the condition for providing the digital content from the second device to the first device is determined not to be satisfied in the determination act.

* * * * *